(12) United States Patent
Weakley et al.

(10) Patent No.: US 8,899,488 B2
(45) Date of Patent: Dec. 2, 2014

(54) RFID TAG SYSTEM

(75) Inventors: Thomas Craig Weakley, Simpsonville, SC (US); Dale R. Masslon, Tolland, CT (US); Andrew F. Geib, Glastonbury, CT (US); Kevin Donahue, Cherry Hill, NJ (US)

(73) Assignee: United Technologies Corporation, Hartford, CT (US)

( * ) Notice: Subject to any disclaimer, the term of this patent is extended or adjusted under 35 U.S.C. 154(b) by 82 days.

(21) Appl. No.: 13/149,391

(22) Filed: May 31, 2011

(65) Prior Publication Data

US 2012/0305652 A1 Dec. 6, 2012

(51) Int. Cl.
*G06K 19/06* (2006.01)
*G06K 19/077* (2006.01)
*G06K 19/07* (2006.01)

(52) U.S. Cl.
CPC ...... *G06K 19/0723* (2013.01); *G06K 19/07773* (2013.01)
USPC ........................................ 235/492

(58) Field of Classification Search
CPC .............. G06K 19/07749; G06K 7/10346; G06K 7/10079; G06K 7/10336; G06K 19/07771; G06K 19/0723; G06K 7/0008; G06K 7/10316; G06K 17/00; G06K 19/0775; G06K 19/07773; G06K 19/07718; G06K 19/07745; G06K 19/07758; G06K 19/07786; G06K 7/10475; G06F 1/1626; G06F 1/1613; G06F 1/1643; G06F 1/1656; G06F 1/1633; G06F 1/1698; G06F 1/1658; G06F 1/1688; G06F 1/26; H05K 13/00; H05K 1/118; H05K 1/147; G08C 17/02

USPC ........................... 235/492; 343/700; 340/572
See application file for complete search history.

(56) References Cited

U.S. PATENT DOCUMENTS 3,327,306 A 6/1967 Ellert et al.
3,747,340 A 7/1973 Fenton et al.
4,423,594 A 1/1984 Ellis
(Continued)

FOREIGN PATENT DOCUMENTS

EP 1602093 12/2005
EP 1766666 3/2007
(Continued)

OTHER PUBLICATIONS

Lee, "Antenna Circuit Design for RFID Applications", Microchip Technology Inc., 2003.
(Continued)

*Primary Examiner* — Thien T Mai
(74) *Attorney, Agent, or Firm* — O'Shea Getz P.C.

(57) ABSTRACT

An RFID tag system includes a housing that includes an enclosed sidewall and forms a recess with a housing base surface, where the housing is configured and arranged to be mounted to a mounting surface. An RFID tag is located within the housing, and the RFID tag comprises an integrated circuit, an antenna and a metal backplane, where the housing base surface separates the antenna and the metal backplane. A metal surface is secured to a top surface of the sidewall to cover the recess, where the metal surface and a transmission path from the integrated circuit to the antenna are electromagnetically coupled and tuned to operate across a wide band frequency range. The metal surface may include a name plate of a data plate for a gas turbine engine, or a component thereof.

14 Claims, 4 Drawing Sheets

(56) References Cited

U.S. PATENT DOCUMENTS

| | | |
|---|---|---|
| 4,490,791 A | 12/1984 | Morrison |
| 4,566,266 A | 1/1986 | Kidd et al. |
| 4,825,639 A | 5/1989 | Krukoski |
| 5,165,845 A | 11/1992 | Khalid |
| 5,479,340 A | 12/1995 | Fox et al. |
| 5,743,079 A | 4/1998 | Walsh et al. |
| 6,330,483 B1 | 12/2001 | Dailey |
| 6,823,675 B2 | 11/2004 | Brunell et al. |
| 7,102,520 B2 | 9/2006 | Liu et al. |
| 7,152,023 B2 | 12/2006 | Das |
| 7,197,147 B2 | 3/2007 | Millott et al. |
| 7,203,554 B2 | 4/2007 | Fuller |
| 7,216,071 B2 | 5/2007 | Volponi |
| 7,219,040 B2 | 5/2007 | Renou et al. |
| 7,224,280 B2 | 5/2007 | Ferguson et al. |
| 7,328,074 B2 | 2/2008 | Das et al. |
| 7,603,222 B2 | 10/2009 | Wiseman et al. |
| 7,688,206 B2 | 3/2010 | Carrender |
| 7,822,512 B2 | 10/2010 | Thatcher et al. |
| 7,837,429 B2 | 11/2010 | Zhang et al. |
| 7,849,732 B2 | 12/2010 | Pashley |
| 7,908,072 B2 | 3/2011 | Tonno et al. |
| 7,916,033 B2 | 3/2011 | Westrick |
| 8,090,456 B2 | 1/2012 | Karpman et al. |
| 8,131,384 B2 | 3/2012 | Karpman et al. |
| 8,171,717 B2 | 5/2012 | Mosley et al. |
| 8,185,291 B2 | 5/2012 | Nakakita et al. |
| 8,215,095 B2 | 7/2012 | Mosley |
| 8,285,468 B2 | 10/2012 | Tonno et al. |
| 8,315,714 B2 | 11/2012 | Karpman et al. |
| 8,484,981 B2 | 7/2013 | Nag |
| 8,523,102 B2 | 9/2013 | Shue et al. |
| 2003/0131605 A1 | 7/2003 | Meisner |
| 2004/0074974 A1* | 4/2004 | Senba et al. ........... 235/492 |
| 2004/0107013 A1 | 6/2004 | Fuller et al. |
| 2004/0123600 A1 | 7/2004 | Brunell et al. |
| 2005/0001785 A1 | 1/2005 | Ferguson |
| 2005/0035924 A1 | 2/2005 | Liu et al. |
| 2005/0193739 A1 | 9/2005 | Brunell et al. |
| 2006/0282177 A1 | 12/2006 | Fuller et al. |
| 2007/0152833 A1* | 7/2007 | Kaplan et al. ........... 340/572.8 |
| 2007/0216534 A1 | 9/2007 | Ferguson et al. |
| 2008/0034731 A1 | 2/2008 | Pashley |
| 2008/0243352 A1 | 10/2008 | Healy |
| 2009/0021379 A1 | 1/2009 | Zhu et al. |
| 2009/0043447 A1 | 2/2009 | Vershinin et al. |
| 2009/0096613 A1* | 4/2009 | Westrick ........... 340/572.8 |
| 2009/0256762 A1 | 10/2009 | Weakley |
| 2009/0281640 A1 | 11/2009 | Fuller |
| 2009/0281641 A1 | 11/2009 | Fuller |
| 2010/0010645 A1 | 1/2010 | Fuller |
| 2010/0050641 A1 | 3/2010 | Nag |
| 2010/0065647 A1* | 3/2010 | Ritamaki et al. ........... 235/492 |
| 2010/0103058 A1 | 4/2010 | Kato et al. |
| 2010/0289626 A1 | 11/2010 | Oberle et al. |
| 2011/0052370 A1 | 3/2011 | Karpman et al. |
| 2011/0057043 A1 | 3/2011 | Weakley |
| 2012/0060505 A1 | 3/2012 | Fuller et al. |

FOREIGN PATENT DOCUMENTS

| | | |
|---|---|---|
| EP | 1769430 | 4/2007 |
| WO | 2006009934 | 1/2006 |
| WO | 2006014231 | 2/2006 |

OTHER PUBLICATIONS

EP search report for EP12170070.2 dated Sep. 9, 2013.
Volpon et al. "The Use of Kalman Filer and Neutral Network Methodologies in Gas Turbine Performance Diagnostics: A Comparative Study", Journal of Engineering for Gas Turbines and Power, vol. 125, No. 4, Oct. 1, 2003, pp. 917-924.
International search report for PCT/US2013/061640 dated Jul. 18, 2014.

* cited by examiner

RFID TAG SYSTEM

BACKGROUND OF THE INVENTION

1. Technical Field

The present invention relates to the field of RFID tags, and in particular to a RFID tag that is electromagnetically tuned to adjacent structure, for wideband operation.

2. Background Information

A radio-frequency identification (RFID) tag generally contains two main components. The first is an antenna that receives and radiates an RF signal. The second component is an integrated circuit that may be mounted to a printed circuit board. The integrated circuit processes a received signal provided by the antenna, and provides a modulated output signal to be radiated by the antenna.

The RFID tag may be an active device (i.e., it includes a battery that powers the tag) or a passive device (i.e., does not include a battery and instead relies upon energy received by the antenna to induce a current that provides a voltage to operate the RFID tag). Notably, passive RFID tags are relatively inexpensive and are used ubiquitously.

One problem with RFID ceramic based (patch) antenna technologies used in RFID tags is that they work well in only one of three regional frequency ranges specified for RFID tags. For example, the United States uses 902-928 MHz, while Japan uses 952-955 MHz and Europe uses 865-869 MHz. As a result, RFID tags are typically designed/tuned to work within a single designated frequency range associated with a certain country/region (i.e., a narrowband frequency range). The country/region dependent frequency ranges creates logistical handling issues.

There is a need for a passive RFID tag system that operates across multiple frequency ranges.

SUMMARY OF THE INVENTION

According to an aspect of the invention, an RFID tag system includes a housing that includes an enclosed sidewall and forms a recess with a housing base surface, where the housing is configured and arranged to be mounted to a mounting surface. An RFID tag is located within the housing, and the RFID tag comprises an integrated circuit, an antenna and a metal backplane, where the housing base surface separates the antenna and the metal backplane. A metal surface is secured to a top surface of the sidewall to cover the recess, where the metal surface and a transmission path from the integrated circuit to the antenna are electromagnetically coupled and tuned to operate across a wide band frequency range.

According to another aspect of the invention, an RFID tag system includes a sidewall that forms a recess, and a passive RFID tag within the recess. The RFID tag comprises an integrated circuit and an antenna where the antenna is electrically coupled to a metallic surface within the recess. A metal surface overlays the recess, where the metal surface and a transmission path from the integrated circuit to the antenna are electromagnetically coupled and tuned to operate across a wide band frequency range.

The metal surface may include a name plate surface of a data plate for a gas turbine engine, or a component thereof. The RFID tag may be attached to metal or non-metal surfaces. The RFID tag system operates over a wider frequency range. For example, the system may be tuned to operate for example within the wide band frequency ranges of about 840 to 960 MHz, 860 to 960 MHz, 900 to 960 MHz, or 860 to 930 MHz.

Wide band frequency range refers to operation across more than one narrow band frequency range.

The metal surface/cover provides an additional capacitance $C_p$ that the may be used to assist in tuning the system to operate within the desired wide band frequency range. For example, the metal surface/cover provides a second pole in the system response.

The foregoing features and the operation of the invention will become more apparent in light of the following description and the accompanying drawings.

DETAILED DESCRIPTION OF THE INVENTION

Figure 1:
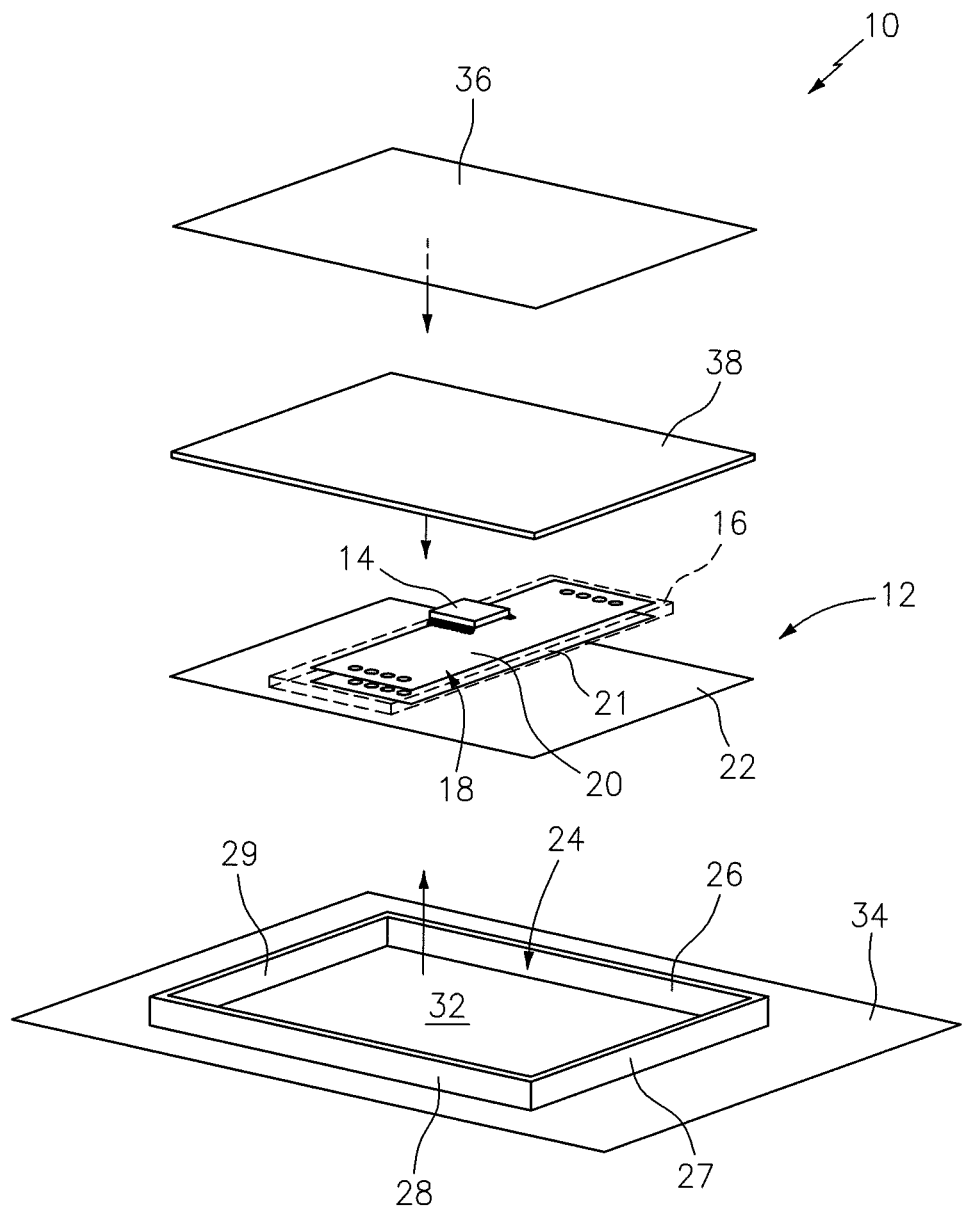
FIG. 1 is a pictorial illustration of a first embodiment of an RFID tag system.

FIG. 1 is a first embodiment of an RFID tag system 10. The system includes an RFID tag 12, which comprises an integrated circuit 14 that may be mounted to a printed circuit board 16, and an antenna 18 mounted on opposing sides of the printed circuit board 16. The antenna 18 includes a first plate 20 located on a first side on the printed circuit board, and a second plate 21 located on an opposite surface of the printed circuit board 16 parallel to the first plate 20. The first and second plates 20, 21 may coupled by a metallic finger that wraps around one or more peripheral edges of the print circuit board. In this embodiment the second plate 21 is electrically connected to a metallic backplane 22 (e.g., Cu, Al, Au, et cetera).

The RFID tag 12 may be placed within a housing 24, which includes sidewalls 26-29 that form a recess. The sidewalls 26-29 may be formed from a dielectric material such as for example a ceramic, and the housing may include a housing base surface 32 that may also be formed from a dielectric. The housing 24 may be mounted to a metallic or non-metallic product surface 34, such as for example a surface of a gas turbine engine or a component part thereof. In one embodiment, the housing may be about 3.5 inches×5 inches, which is a size of a conventional data plate holder used my gas turbine engine manufacturers. Another conventional housing size is 2 inches×1 inch.

The RFID tag system 10 also includes a metal cover plate/surface 36 that is positioned over and physically separated from the RFID tag 12 located within the recess of the housing 24. The plate/surface 36 may be secured to the housing via threaded fasteners located in each of the corners of the housing. The fasteners are preferably electrically insulate the housing from the place/surface 36. For example, the fastener may include a metallic screw with a PFTE washer such a TEFLON® washer. However, it is contemplated that the fasteners may also be metallic to shunt to the plate/surface 36 to the metallic backplane 22. The RFID tag 12 and the metal plate 36 are electromagnetically coupled when exposed to a radiating RF reader, and tuned to operate over a wide frequency range, such as for example about 840 to 960 MHz, 860 to 960 MHz, 900 to 960 MHz, or 860 to 930 Mhz. The system may also include a dielectric spacer substrate 38 that physically separates the integrated circuit 14 and the metal cover plate 36. The dielectric spacer substrate may be a foam, a thermal insulator for high temperature operation, air, et cetera.

Figure 2:
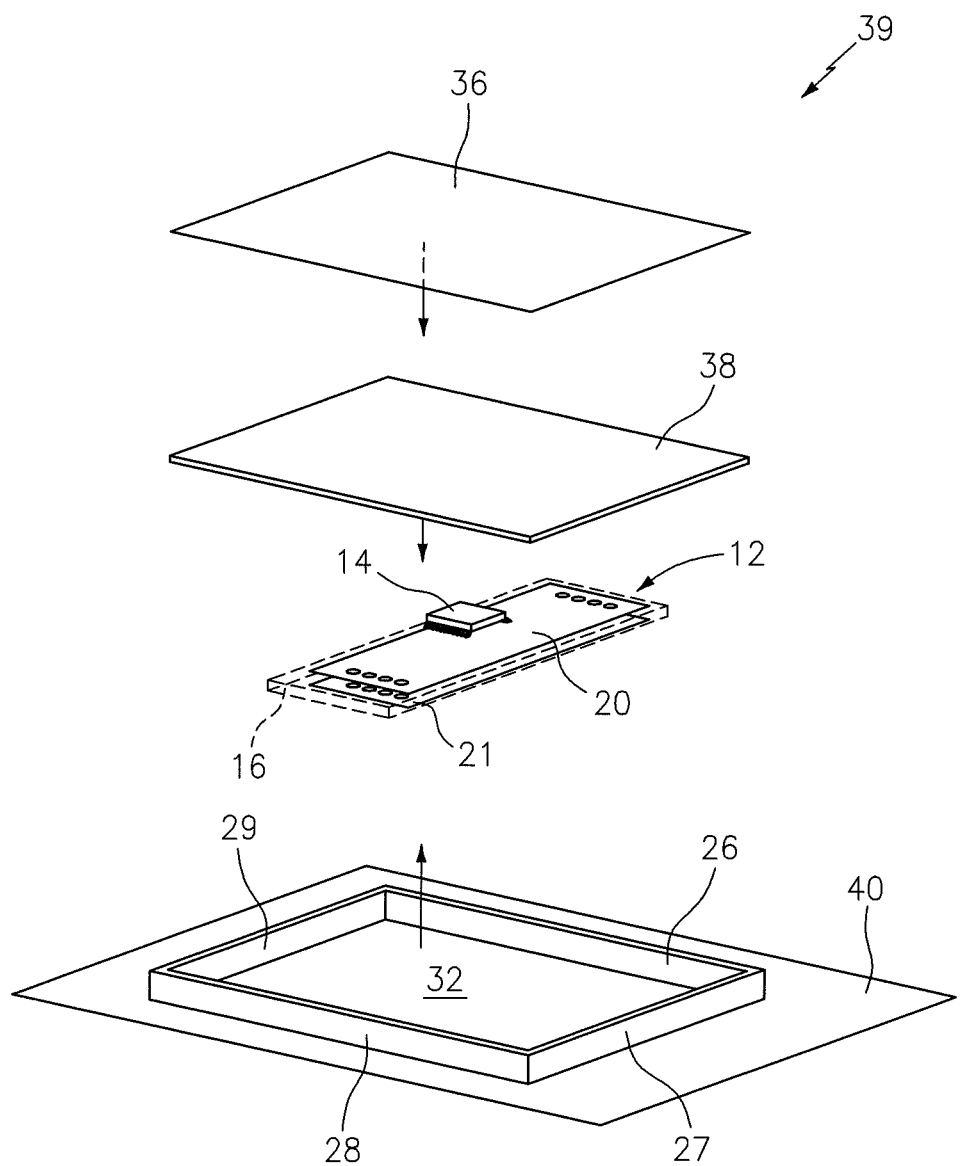
FIG. 2 is a pictorial illustration of a second embodiment of an RFID tag system.

FIG. 2 illustrates a second embodiment of an RFID tag system 39. The system of FIG. 2 is substantially the same as the system illustrated in FIG. 1, with the principal exception that the system in FIG. 2 does not include a metal backplane 22 illustrated in FIG. 1. In the embodiment of the FIG. 2, the housing base surface 32 contacts a metallic surface 40.

Figure 3:
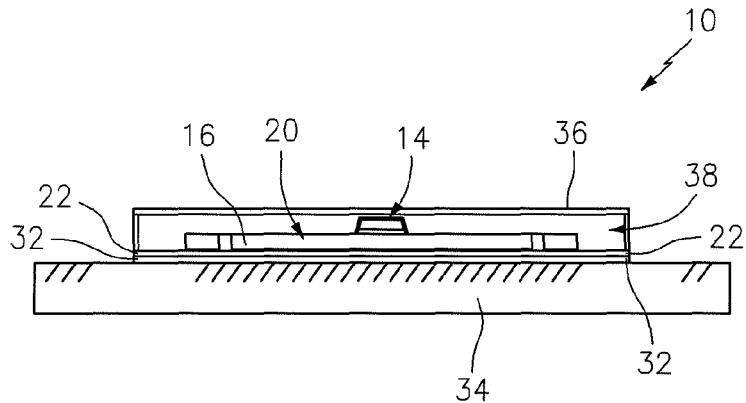
FIG. 3 is a cross-sectional illustration of the RFID tag system of FIG. 1 including a metallic backplane.

FIG. 3 is a cross-sectional illustration of the RFID tag system 10 of FIG. 1. In this embodiment, since the system 10 includes the metallic backplane 22, the product mounting surface 34 may be metallic or non-metallic.

Figure 4:
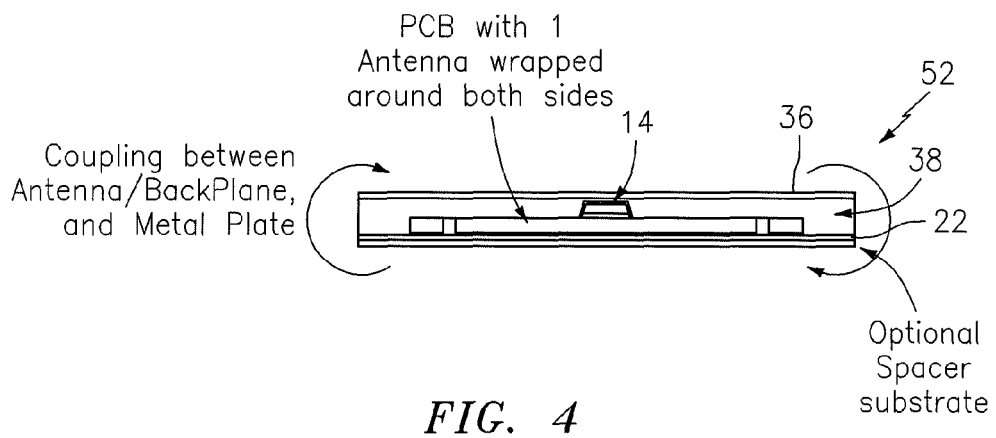
FIG. 4 is a cross-sectional illustration of an RFID tag system of FIG. 1 without the metallic backplane and mounted on a metallic surface.

FIG. 4 is a cross-sectional illustration of an RFID tag system 52. This embodiment is substantially the same as the embodiment illustrated in FIG. 3 with the principal exception that the RFID tag system does not have to be coupled to a surface, such as mounting surface 34 illustrated in FIG. 3.

Figure 5:
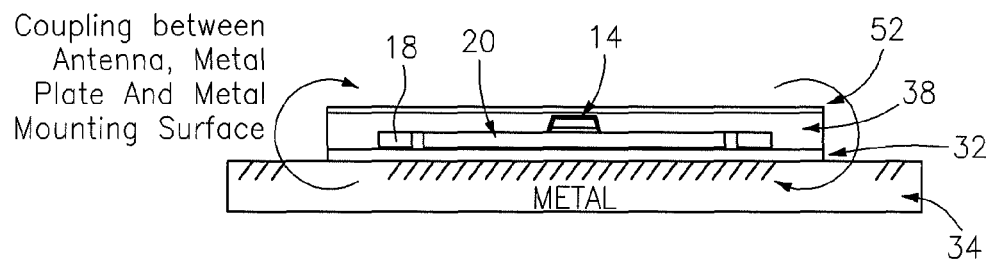
FIG. 5 is a cross-sectional illustration of the RFID tag system illustrated in FIG. 2.

FIG. 5 is cross-sectional illustration of the RFID tag system 39 illustrated in FIG. 2. In this embodiment the base surface 32 of the housing 24 connects to mounting surface 40, which is metallic.

Figure 6:
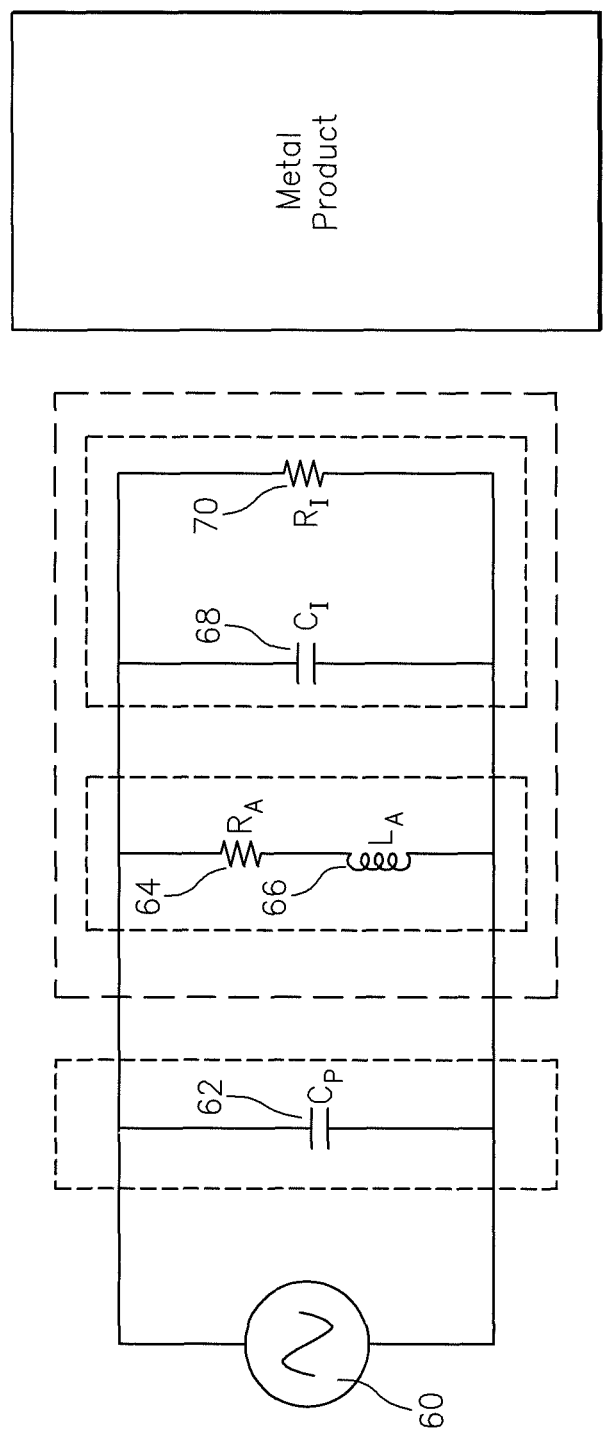
FIG. 6 is a schematic illustration of an equivalent electrical circuit representation of an RFID reader electromagnetically coupled to RFID tag system of FIG. 1.

FIG. 6 is a schematic illustration of an equivalent electrical circuit representation of an RFID reader electromagnetically coupled to the RFID tag system 10. The RFID tag reader radiates an RF signal, which the RFID tag receives and converts to an electrical signal. Thus in this equivalent electrical circuit representation the RFID reader is electrically represented by a signal source 60. The metal plate 36 is represented by its capacitance value Cp 62. The equivalent electrical circuit representation of the RFID tag 12 includes components for the antenna and the integrated circuit, both of which are equivalently illustrated in FIG. 6. The antenna has an impedance that includes a serially connected resistance $R_A$ 64 and inductance $L_A$ 66. The integrated circuit 14 is represented by an impedance shown as capacitance $C_I$ 68 and a resistance $R_I$ 70, which are shown in electrical series. The metal surface/cover provides the capacitance $C_p$ that the may be used to tune the system to operate within the desired wide band frequency range. For example, the metal surface/cover provides a second pole in the RFID tag system response.

In addition to the capacitance $C_p$ provided by the metal surface/cover 36 (FIG. 1), the system response may be tuned using by adjusting the shape of the antenna (e.g., placing notch on the top plate 20), adjusting the distance between surfaces, the surface area of metal surfaces that provide a capacitance, et cetera.

Although this invention has been shown and described with respect to the detailed embodiments thereof, it will be understood by those skilled in the art that various changes in form and detail thereof may be made without departing from the spirit and scope of the claimed invention.

What is claimed is:

1. An RFID tag system, comprising:
   a mounting surface;
   a housing that includes an enclosed sidewall and a housing base surface, the enclosed sidewall forming a recess with the housing base surface, wherein the housing is mounted to the mounting surface;
   an RFID tag comprising an integrated circuit, an antenna and a metal backplane, wherein the housing base surface separates the antenna and the mounting surface; and
   a metal surface secured to a top surface of the sidewall to cover the recess, wherein the metal surface and a transmission path from the integrated circuit to the antenna are electromagnetically coupled and tuned to operate across a wide band frequency range;
   wherein the RFID tag is arranged within the housing between the housing base surface and the metal surface.

2. The RFID tag system of claim 1, wherein the sidewall comprises a dielectric.

3. The RFID tag system of claim 1, wherein the sidewall is selected from the group consisting of a polymer or a ceramic.

4. The RFID tag system of claim 1, wherein the metal surface is selected from a metal comprising copper, steel, aluminum or an alloy.

5. The RFID tag system of claim 1, wherein the metal backplane comprises a high conductivity metal such as copper, aluminum or gold.

6. The RFID tag system of claim 1, further comprising a dielectric spacer substrate positioned between the RFID tag and the metal surface.

7. The RFID tag system of claim 1, wherein the housing base surface comprises a dielectric.

8. The RFID tag system of claim 1, wherein the housing base surface comprises thermal paper.

9. The RFID tag system of claim 1, wherein the metal surface comprises a metal foil.

10. The RFID tag system of claim 1, wherein the RFID tag comprises a printed circuit board to which the integrated circuit and the antenna are electrically connected together to form a passive RFID tag.

11. The RFID tag system of claim 10, wherein the antenna is located on first and second parallel planar surfaces of the printed circuit board.

12. The RFID tag system of claim 10, wherein housing is secured to the mounting surface with a plurality of dielectric fasteners.

13. The RFID tag system of claim 10, wherein housing is secured to the mounting surface with a plurality of fasteners that electrically short the metal surface to the mounting surface.

14. The RFID tag system of claim 1, wherein the mounting surface comprises a metallic surface of a gas turbine engine.

* * * * *